United States Patent
Kind et al.

(10) Patent No.: US 9,488,318 B2
(45) Date of Patent: Nov. 8, 2016

(54) PROCESS FOR PRODUCING A SELF-ILLUMINATING BODY AND SELF-ILLUMINATING BODY

(71) Applicant: MB-Microtec AG, Niederwangen bei Bern (CH)

(72) Inventors: Hannes Kind, Bern (CH); Sandro M. O. L. Schneider, Thalwil (CH)

(73) Assignee: MB-Microtec AG, Niederwangen bei Bern (CH)

( * ) Notice: Subject to any disclaimer, the term of this patent is extended or adjusted under 35 U.S.C. 154(b) by 0 days.

(21) Appl. No.: 14/424,773

(22) PCT Filed: Aug. 28, 2013

(86) PCT No.: PCT/EP2013/067776
§ 371 (c)(1),
(2) Date: Feb. 27, 2015

(87) PCT Pub. No.: WO2014/033151
PCT Pub. Date: Mar. 6, 2014

(65) Prior Publication Data
US 2015/0252952 A1   Sep. 10, 2015

Related U.S. Application Data

(60) Provisional application No. 61/743,743, filed on Sep. 11, 2012.

(30) Foreign Application Priority Data

Aug. 28, 2012 (AT) .................................. A 938/2012

(51) Int. Cl.
*F21K 2/00* (2006.01)
*G04B 19/32* (2006.01)

(52) U.S. Cl.
CPC ................. *F21K 2/00* (2013.01); *G04B 19/32* (2013.01)

(58) Field of Classification Search
CPC .................................. F21K 2/00; G04B 19/32
USPC .......... 250/462.1, 463.1, 464.1, 465.1, 466.1
See application file for complete search history.

(56) References Cited

U.S. PATENT DOCUMENTS

| 2,155,449 A | 4/1939 | Seaman |
| 2,953,684 A | 9/1960 | Machutchin et al. |

(Continued)

FOREIGN PATENT DOCUMENTS

| DE | 1 596 843 B | 7/1970 |
| DE | 2 104 763 A1 | 8/1972 |

(Continued)

OTHER PUBLICATIONS

International Search Report of PCT/EP2013/067776, mailed Feb. 28, 2014.

(Continued)

*Primary Examiner* — Mark R Gaworecki
(74) *Attorney, Agent, or Firm* — Collard & Roe, P.C.

(57) ABSTRACT

A process produces self-illuminating bodies, in which a recess is made in a housing part of a housing and a fluorescent and/or phosphorescent layer and/or a mask is arranged on a boundary wall of a cavity which is formed by joining the housing parts together. The housing parts are connected in a gastight manner, with at least one feed opening from outside into the cavity remaining open. Furthermore, a medium emitting decaying radiation is introduced through the at least one feed opening into the cavity, the decaying radiation being intended to illuminate the fluorescent and/or phosphorescent layer. Furthermore, a self-illuminating body and also the use thereof are specified.

25 Claims, 2 Drawing Sheets

(56) References Cited

U.S. PATENT DOCUMENTS

Figure 1:
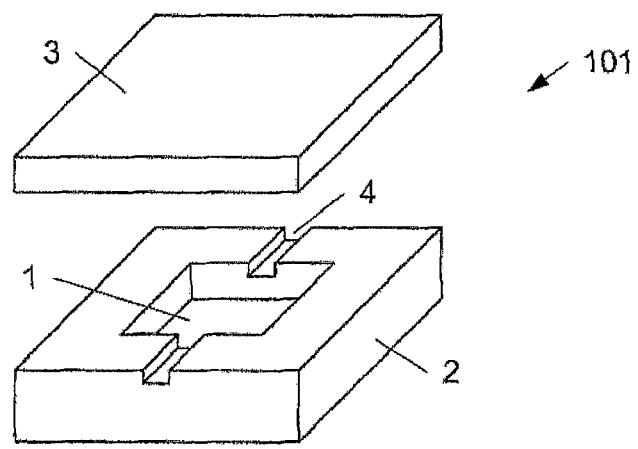

| | | |
|---|---|---|
| 3,026,436 A | 3/1962 | Hughes |
| 3,335,336 A | 8/1967 | Urushida et al. |
| 3,409,770 A | 11/1968 | Clapham, Jr. |
| 3,478,209 A | 11/1969 | Feuer |
| 3,566,125 A | 2/1971 | Linhart, Jr. et al. |
| 3,908,266 A | 9/1975 | Hill et al. |
| 3,920,996 A | 11/1975 | Moore, III |
| 4,126,384 A | 11/1978 | Goodman et al. |
| 4,214,820 A | 7/1980 | Leibowitz et al. |
| 4,414,460 A | 11/1983 | Sudo et al. |
| 4,869,744 A | 9/1989 | Romberg |
| 4,990,804 A * | 2/1991 | McNair .................. F21K 99/00 250/458.1 |
| 5,025,550 A | 6/1991 | Zirbes et al. |
| 6,176,753 B1 | 1/2001 | Pong et al. |
| 2002/0125816 A1 | 9/2002 | Dunham et al. |
| 2004/0237422 A1 | 12/2004 | Tat et al. |
| 2006/0174658 A1 | 8/2006 | Huang et al. |
| 2007/0001579 A1 | 1/2007 | Jeon et al. |

FOREIGN PATENT DOCUMENTS

| | | |
|---|---|---|
| DE | 2 237 616 A1 | 3/1974 |
| DE | 25 38 806 A1 | 7/1976 |
| DE | 10 2006 024 566 A1 | 8/2007 |
| EP | 0 055 416 A2 | 7/1982 |
| EP | 0 062 604 A1 | 10/1982 |
| EP | 0 069 311 A1 | 1/1983 |
| EP | 1 216 971 A1 | 6/2002 |
| EP | 1 741 510 A1 | 1/2007 |
| JP | S51-81638 A | 7/1976 |
| JP | S54 19573 A | 2/1979 |
| JP | S54 19574 A | 2/1979 |
| JP | 2005-066629 A | 3/2005 |
| JP | 2009/015131 A | 1/2009 |
| KR | 2008-0023485 A | 3/2008 |
| WO | 2008/035770 A1 | 3/2008 |

OTHER PUBLICATIONS

International Search Report of PCT/EP2013/067686, mailed Mar. 17, 2014.

* cited by examiner

PROCESS FOR PRODUCING A SELF-ILLUMINATING BODY AND SELF-ILLUMINATING BODY

CROSS REFERENCE TO RELATED APPLICATIONS

This application is the National Stage of PCT/EP2013/067776 filed on Aug. 28, 2013, which claims priority under 35 U.S.C. §119(e) of U.S. Provisional Application Ser. No. 61/743,743 filed on Sep. 11, 2012, and under 35 U.S.C. §119 of Austrian Application No. A 938/2012 filed on Aug. 28, 2012, the disclosures of which are incorporated by reference. The international application under PCT article 21(2) was not published in English.

The invention relates to a method for the production of a self-luminous body, in which a fluorescent and/or phosphorescent layer is made to produce light, using a medium that emits a decay radiation, as well as to such a self-luminous body and a use of the same.

Self-luminous bodies of the stated type are fundamentally known and are sold by the applicant, for example, under the trade name "trigaligh." In this embodiment, a layer of zinc sulfide (ZnS) is made to light up by means of tritium gas. The self-luminous bodies of the aforementioned type are therefore also known as "tritium gas lights."

Use of the known tritium gas lights is restricted in that they are subject to great restrictions with regard to their shape. Essentially, these known lights have a disadvantageous ratio of surface area to thickness.

It is therefore a task of the invention to create an improved production method for a self-luminous body, and an improved self-luminous body.

The task of the invention is accomplished by means of a method for the production of self-luminous bodies, comprising the steps:
  making at least one depression in at least one housing part of a housing,
  producing a fluorescent and/or phosphorescent layer formed from a substance that can be excited to produce light, by means of decay radiation, and/or a mask on at least part of a delimitation wall of at least one cavity,
  producing the at least one cavity by means of joining the housing parts together,
  connecting the housing parts in gas-tight manner, wherein at least one feeder opening, particularly at least two feeder openings, remains/remain open into the cavity from the outside, and
  introducing a medium that emits a decay radiation for a substance that can be excited to produce light, or the substance and the medium, into the at least one cavity, through the at least one feeder opening.

The task of the invention is furthermore accomplished by a self-luminous body comprising a housing composed of at least two housing parts, having a depression in at least one of the housing parts, which are connected with one another in gas-tight manner and enclose a cavity, wherein at least one feeder opening to the cavity is provided, which opening extends from the outside into the cavity and is closed and welded in gas-tight manner, and wherein a layer of a fluorescent and/or phosphorescent substance that can be excited to produce light, by means of decay radiation, and a medium that emits decay radiation for a substance that can be excited to produce light are disposed in the cavity.

In this manner, self-luminous bodies having practically any desired shape, particularly also planar self-luminous bodies, also having a slight thickness in relation to their surface area, can be produced. By means of selective coating of the housing part and/or of the housing parts with a fluorescent and/or phosphorescent substance, the light-emitting surface can furthermore be well structured. In this way, any desired luminous letters, numbers, symbols or other geometric surfaces, among others, can be implemented.

The self-luminous body produced in this manner can particularly be used as a watch crystal or as the face of a watch. However, use as emergency lighting, a door sign, keyboard background light and the like are also conceivable. The advantages of the invention, particularly the possibility of producing essentially planar lighting elements, particularly stand out in these uses.

Further advantageous embodiments of the production method are evident from the following description, particularly in connection with the figures.

It is advantageous if the fluorescent and/or phosphorescent layer is produced by means of coating the housing part and/or the housing parts with an adhesive and subsequently applying a fluorescent and/or phosphorescent substance onto the adhesive layer. In this way, even fluorescent and/or phosphorescent media that have no or few adhesion properties or adhesive properties can be used for the coating. Coating of the housing part with the fluorescent and/or phosphorescent substance (e.g. ZnS and/or ZnO) can take place by means of stamping, for example, as well as by means of sputtering.

It is particularly advantageous if the adhesive and/or the fluorescent and/or phosphorescent substance or the fluorescent and/or phosphorescent layer is/are applied to the housing part and/or the housing parts before production of the cavity. In this way, the housing part and/or the housing parts can be selectively coated with adhesive and/or a fluorescent and/or phosphorescent substance, in comparatively simple manner. For example, the layers can be sprayed on or rolled on, particularly using masks. It is also conceivable, for example, to imprint the layers or to stamp them on.

It is also advantageous if the adhesive and/or the fluorescent and/or phosphorescent substance or the fluorescent/phosphorescent layer is/are introduced into the (finished) cavity by means of the at least one feeder opening. In this way, luminous layers having a large area (and particularly layers that are unstructured) can be produced in simple manner.

It is particularly advantageous if the adhesive is applied to the housing and/or the housing parts before the cavity is produced, and the fluorescent and/or phosphorescent substance is introduced into the cavity by means of the at least one feeder opening. In the case of this variant, selective wetting of the housing part and/or of the housing parts with adhesive is combined with simple deposition of the fluorescent and/or phosphorescent substance. In this way, a simple method for the production of structured luminous surfaces is obtained.

In general, the fluorescent and/or phosphorescent substance can be introduced as a powder, as a gel, in the gas phase or as a solution. In particular, in this connection the flow behavior of the stated substance can be improved by means of providing a micro-structure or nano-structure.

Advantageous possibilities for applying the fluorescent and/or phosphorescent substance to the housing parts are sputtering, vapor-depositing, spraying, rolling or spin-coating it on.

It is advantageous if the depression is produced in the housing part by means of mechanical working (e.g. milling, ultrasound drilling) or using ion-beam removal, laser-beam removal, powder blasting or chemical etching. All these methods allow production of a depression within the scope of a proven production process, which thereby takes place in controlled manner.

It is advantageous if a mask is disposed between the housing parts or on them. In particular, the mask can also be disposed between the fluorescent and/or phosphorescent layer and at least one housing part. In this way, it is possible to produce luminous letters, numbers, symbols, and geometrical surfaces, for example, without the fluorescent/phosphorescent layer having to be structured for this purpose. Instead, an unstructured fluorescent/phosphorescent layer is combined with a structured mask, which allows the light produced to partially pass through, or partially reflects or absorbs it.

It is advantageous if the housing parts as well as, if applicable, the mask are connected with one another by means of fusion bonding, for example at temperatures of 700-800° C. In this connection, the boundary surfaces of the connected parts are held together by means of van der Waals' forces.

It is also advantageous if the housing parts and, if applicable, the mask are connected with one another by means of anodic bonding, for example at temperatures of 350-450° C. In this method, a chemical bond is initiated at the boundary surfaces of the parts to be connected, by means of electrical attraction forces, in other words by applying an electrical voltage.

It is advantageous if the at least one feeder opening is welded shut using a laser and/or a gas flame. In this way, it is possible to close the feeder opening without the aid of additional substances. At this point, it is noted that methods for welding glass parts, using a laser, are known as such, for example from EP 1 741 510 A1.

It is advantageous if
  glass or silicon is provided as the housing part and/or
  glass or boron silicate is provided as an at least partially transparent housing part and/or
  zinc sulfide (ZnS) and/or zinc oxide (ZnO) and/or a zinc cadmium layer and/or magnesium sulfide and/or $Y_2O_2S$ and/or another radioluminescent substance is/are introduced as a fluorescent and/or phosphorescent substance, and/or
  phosphoric acid ($H_3PO_4$) is applied as an adhesive and/or tritium gas is introduced as a medium that emits decay radiation.

Particularly by means of the use of zinc sulfide (ZnS) and/or zinc oxide and tritium gas, the self-luminous body is implemented using means that are proved in connection with tritium gas lights, so that great reliability of the self-luminous body can also be assumed.

In this connection, it is advantageous if phosphoric acid ($H_3PO_4$) is applied as an adhesive, and if zinc sulfide (ZnS) is introduced as a fluorescent and/or phosphorescent substance. Likewise, zinc oxide (ZnO) can be used. It has an advantageous effect, in this connection, that phosphoric acid as such does not have any excessive adhesion properties, and only forms an adhesive layer in combination with zinc sulfide (ZnS) and/or zinc oxide. The adhesive, which is present in the form of phosphoric acid, can thereby be applied in very differentiated manner, thereby making it possible to produce fine structures. For example, the phosphoric acid can be applied using the ink-jet printing method.

However, it is also advantageous if a mixture of phosphoric acid ($H_3PO_4$) and zinc sulfide (ZnS) and/or zinc oxide (ZnO) is applied as the fluorescent/phosphorescent layer. In the case of this variant, a substance that is adhesive in and of itself is therefore applied to the housing part and/or the housing parts. This variant is therefore particularly suitable for imprinting (for example using the calender printing method or stamping method).

It is advantageous if at least one of the housing parts is provided with support elements disposed distributed over the surface area of the cavity, which elements extend in the direction of the other housing part, and if the housing parts are supported on one another by way of these support elements. In this manner, the housing parts are prevented from being deformed or bent, particularly excessively, relative to one another.

In this connection, it is furthermore advantageous if at least one of the two housing parts is connected with the support elements. In this way, the support elements can be positioned well in the cavity. If the support elements are connected with both housing parts, tensile forces and shear forces can also be better transferred between them.

It is advantageous if the housing is configured as a block or flat piece, particularly if the block or flat piece is formed by two essentially plate-shaped housing parts having a polygonal or elliptical or circular base surface, and if the sum of the heights of the two housing parts that are perpendicular to the base surface is less than the shorter side length or a minimal diameter or radius of the same. In this manner, the light-emitting surface area is relatively large in proportion to the volume of the self-luminous body.

However, it is also advantageous if a reflective coating is disposed on the side of the body that faces away from the observer side, thereby making it possible to approximately double the light generated toward the observer.

Supplementally, it is noted that the embodiment variants disclosed with regard to the method and the advantages resulting from them relate equally to the variants and advantages presented with regard to the self-luminous body, and vice versa.

For a better understanding of the invention, it will be explained in greater detail below, using the following figures.

Figure 2:
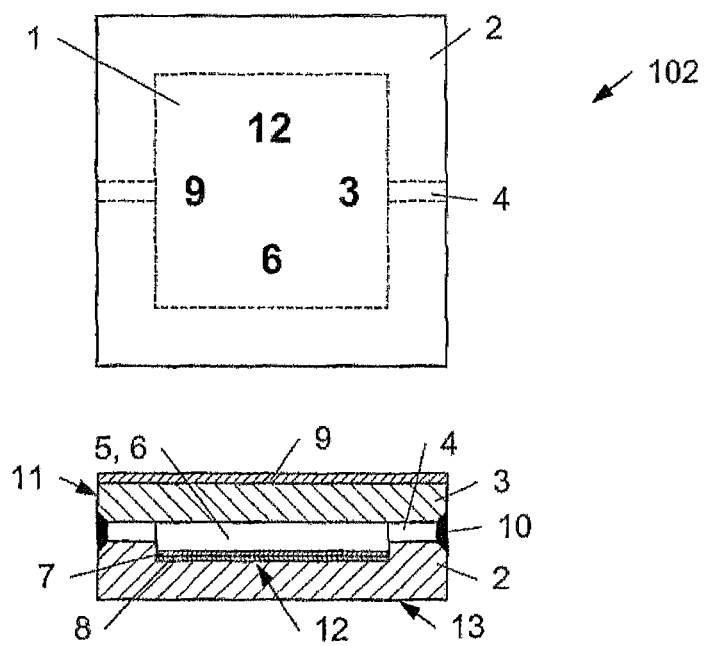
Figure 3:
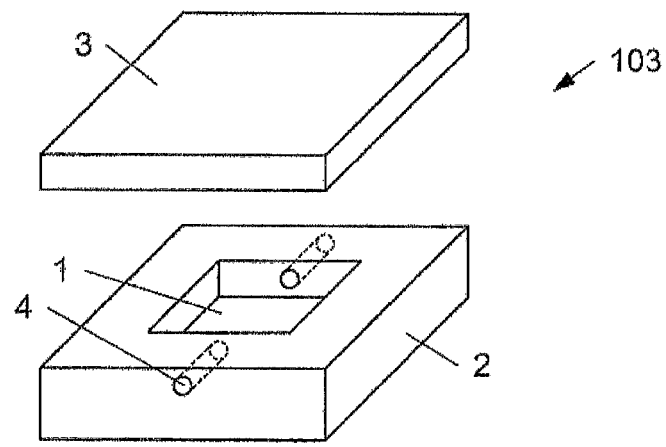
Figure 4:
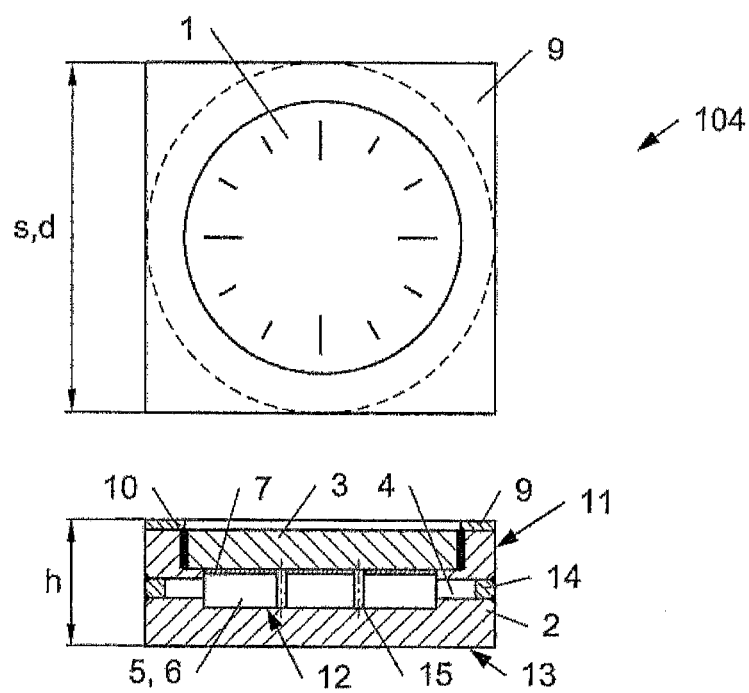

These show, in a greatly schematically simplified representation, in each instance:

FIG. 1 housing parts of an exemplary self-luminous body in an exploded representation;

FIG. 2 an exemplary self-luminous body in the form of a watch face;

FIG. 3 like FIG. 1, only with a feeder opening configured in a different manner, and FIG. 4 a variant of a self-luminous body in the form of a warning sign.

As an introduction, it should be stated that in the different embodiments that are described, the same parts are provided with the same reference symbols or with the same component designations, whereby the disclosures contained in the entire specification can be analogously applied to the same parts having the same reference symbols or the same component designations. Also, position information selected in the specification, such as, for example, at the top, at the bottom, on the side, etc., refer to the figure being directly described and shown, and must be transferred appropriately to the new position if the position is changed. Furthermore, individual characteristics or combinations of characteristics from the different exemplary embodiments that are shown and described can represent independent inventive solutions or solutions according to the invention, in and of themselves.

All the information concerning value ranges in the present specification is to be understood to mean that these comprise any and all partial ranges of these; for example, the statement 1 to 10 should be understood to mean that all the partial ranges, starting from the lower limit 1 and the upper limit 10, are included, i.e. all partial ranges begin with a lower limit of 1 or greater and end at an upper limit of 10 or less, for example 1 to 1.7 or 3.2 to 8.1 or 5.5 to 10.

The exemplary embodiments show possible embodiment variants of a self-luminous body, whereby it should be noted at this point that the invention is not restricted to the specifically shown embodiment variants of the same, but rather diverse combinations of the individual embodiment variants with one another are possible, and this variation possibility lies within the ability of a person skilled in the art of this technical field, because of the teaching for technical action provided by the present invention. Therefore all conceivable embodiment variants that are possible by combining individual details of the embodiment variant that is shown and described are also covered by the scope of protection.

FIG. 1 shows an intermediate stage in the production of a self-luminous body 101. In concrete terms, FIG. 1 shows an exemplary housing part 2 (e.g. composed of glass or silicon) and a further housing part 3 (e.g. composed of glass or boron silicate) of a self-luminous body 101 in an exploded representation. The method for production of the self-luminous body 101 will now be explained in greater detail using FIG. 1.

The method comprises the steps:
- making at least one depression 1 in at least one housing part 2, 3 of a housing,
- producing a fluorescent and/or phosphorescent layer formed from a substance that can be excited to produce light, by means of decay radiation, and/or a mask on at least part of a delimitation wall of at least one cavity,
- producing at least one cavity by means of joining the housing parts 2, 3 together,
- connecting the housing parts 2, 3 in gas-tight manner, wherein at least one feeder opening 4, particularly at least two feeder openings 4 remains/remain open into the cavity from the outside,
- introducing a medium that emits a decay radiation for a substance that can be excited to produce light, or the substance and the medium, into the at least one cavity, through the at least one feeder opening 4,
- closing and welding the at least one feeder opening 4 by means of laser radiation.

The depression 1 can be milled into the housing part 2, for example. It is also conceivable that the depression 1 is produced using an ion beam. Likewise, the grooves provided for the feeder openings 4 can also be milled or produced using an ion beam.

On the other hand, the depression 1 can be produced in one of the surfaces of at least one of the housing parts 2, 3 that face one another, to form a cavity or part of a cavity. However, other material removal methods, such as laser removal methods, powder blasting, and the like can also be used for the production of the depression and/or of the feeder openings 4.

A cavity having two feeder openings 4 is then formed by setting the housing part 3 onto the housing part 2. For example, the housing part 3 can be glued onto the housing part 2 or welded to it.

A fluorescent/phosphorescent layer is produced on at least one delimitation wall of the cavity. For example, this can take place in that the housing part 2 and/or the housing part 3 is/are coated with adhesive (e.g. phosphoric acid $H_3PO_4$), and subsequently, a fluorescent and/or phosphorescent substance (e.g. zinc sulfide ZnS and/or zinc oxide ZnO) is applied to the adhesive layer. For the use according to the invention, it is advantageously also possible to use media from the series of zinc sulfite, zinc oxide or phosphoric acid as a substance that can be made to produce light, by a medium that emits decay radiation.

It is also conceivable that the adhesive and, subsequently, the fluorescent and/or phosphorescent substance that forms the fluorescent and/or phosphorescent layer is introduced into the cavity through one of the two feeder openings 4. For this purpose, one of the two feeder openings 4 can be connected with an inflow line, and the other feeder opening 4 can be connected with an outflow line. Adhesive can be introduced into the cavity in the form of a liquid or in the form of a mist, by way of the inflow line, and excess adhesive can be carried away by way of the outflow line. In the same manner, the fluorescent and/or phosphorescent substance can be introduced into the cavity and carried away from it, either by way of the same lines or by way of separate lines.

The fluorescent and/or phosphorescent substance can be introduced into the cavity in a solution or in the gas phase or as a powder or gel or as a polymer.

In a further variant of the method, the adhesive layer is applied to the housing part 2 and/or the housing part 3 before the parts are joined together. In a further step, the housing part 2 and the housing part 3 are joined together, and subsequently, the fluorescent and/or phosphorescent substance is introduced by way of the feeder openings 4. This variant has the advantage that the adhesive can be applied very selectively, specifically using a mask, to the housing part 2 and/or the housing part 3, for example sprayed on or rolled on. It is also conceivable that the adhesive and/or the fluorescent and/or phosphorescent substance is/are imprinted or stamped on, and thereby selective wetting of the housing part 2 and/or of the housing part 3 with adhesive and/or the fluorescent and/or phosphorescent substance can be produced. The selective adhesive application can take place, for example, in the form or letters, numbers, symbols or other geometric figures, or any desired surfaces, for example. When the fluorescent and/or phosphorescent substance is subsequently introduced into the cavity, it deposits on the wetted surfaces and also forms letters, numbers, symbols, etc. Furthermore, it is conceivable that not only is the adhesive applied to the housing part 2 and/or the housing part 3, but rather also the fluorescent and/or phosphorescent substance is applied to the adhesive layer before the housing part 2 and the housing part 3 are joined together. Finally, it is also possible that the fluorescent and/or phosphorescent substance itself has adhesive or adhering properties. Separate adhesive application can then be eliminated. For example, a mixture of phosphoric acid ($H_3PO_4$) and zinc sulfide (ZnS) and/or zinc oxide (ZnO) can be applied directly.

In general, the fluorescent and/or phosphorescent substance 7 can be applied to the housing part 2, 3 or introduced into the cavity 5 as a powder, as a gel, in a gas phase or in solution, and, in addition to the methods already mentioned, can also be sputtered, vapor-deposited, sprayed, rolled on or applied by means of spin-coating.

A medium that emits decay radiation (e.g. tritium gas) is then introduced into the cavity provided with the finished layer or ply of the fluorescent and/or phosphorescent substance, in order to excite the fluorescent and/or phosphorescent substance to produce light, whereby once again, the two feeder lines 4 can function as an inflow and an outflow.

A medium that emits decay radiation is understood to be a material that has atoms that decay spontaneously, such as tritium or radioactive carbon such as $C_{14}$.

In a further step, the feeder openings 4 are closed, for example glued shut or closed and welded by means of heat effect by means of laser radiation and/or a gas flame.

FIG. 2 now shows a top view of and a cross-section through an exemplary self-luminous body 102. In this connection, once again a housing part 2 is connected with a housing part 3, with a cavity 5 being formed from a depression 1 and feeder openings 4 being formed from grooves in the housing part 2. In the finished self-luminous body 102, this cavity 5 is filled with a medium 6 that emits a decay radiation. In this example, it is assumed that the underside of the cavity 5 is equipped, over its full area, with a fluorescent/phosphorescent layer 7 that has been applied using an adhesive layer 8. Of course, the layers 7 and 8 can equally be disposed on the top side of the cavity 5. Therefore at least a part of the surface 12 of the housing parts 2, 3 that delimits a cavity 5 is coated with the fluorescent and/or phosphorescent substance 7.

A light-impermeable or at least light-weakening mask 9 is disposed on the housing part 3 itself. Holes in the shape of the numbers 3, 6, 9, and 12 are provided in this layer. As can easily be imagined, the light generated in the cavity 5 or in the fluorescent and/or phosphorescent layer 7, respectively, penetrates through these holes, thereby making it possible to produce a self-luminous face of a watch. In this connection, the numbers appear bright on a dark background.

In the example given, the mask 9 is disposed on the outside 11 of the self-luminous body 102 that faces away from the cavity 5, and covers at least a part of its outer surface 11. A further possibility is to apply the mask 9 directly to the fluorescent and/or phosphorescent layer 7 or between the housing parts 2, 3. It is also conceivable that the mask 9 is disposed between the layer 7 of the fluorescent and/or phosphorescent substance and the housing part 3, if the fluorescent and/or phosphorescent layer 7—in contrast to what is shown in FIG. 2—is disposed on the top side of the cavity 5.

Of course, it would also be possible to eliminate the mask 9 and to form the numbers directly using the fluorescent and/or phosphorescent substance 7, instead, for which purpose one of the methods mentioned above can be used. The numbers then also appear on a dark background. It would also be conceivable to produce a negative image of the numbers. The numbers then appear dark on a bright background. In particular, if no mask 9 is used, the self-luminous body 102 can also be used directly as a watch crystal or as a watch body, in general. For example, the hands can move in the cavity 5 of the self-luminous body 102. However, the housing part 3 could also be configured as an LCD display, thereby making it possible to implement a back-lighted display. Of course, the mask 9 can also be disposed between the housing part 2 and the housing part 3.

In general, the housing part 2 and the housing part 3, as well as, if applicable, the mask 9 can be connected with one another by means of fusion bonding (bonding of the boundary surfaces by means of van der Waals' forces) or also by means of anodic bonding (chemical bonding at the boundary layers, which is initiated by means of electrical attraction forces). The feeder openings 4 can be welded, as shown in FIG. 2, using a laser (e.g. $CO_2$ laser, fiber laser, etc.), or can also be glued or provided with a plug.

FIG. 3 shows a further variant of a self-luminous body 103, which is very similar to the variant shown in FIG. 1. However, bores are provided as feeder openings 4 (having a diameter of 2 μm to 1 mm) here, in place of a groove. These can be produced mechanically, for example, using a drill, a laser beam or an ion beam.

FIG. 4 shows a further variant of a self-luminous body 104, in which holes are disposed as feeder openings 4 in the housing part 2, as in FIG. 3. In contrast to the variant from FIG. 3, the housing part 3 is somewhat smaller here than the housing part 2, and is inserted into a depression of the same. In this case, the housing part 2 and the housing part 3 are welded to one another using a weld seam 10. A frame-shaped mask 9 is set onto the housing part 3, which mask prevents light from shining through in the edge region of the self-luminous body 104.

In the previous examples, it was assumed that the self-luminous body is configured as a block and therefore has a rectangular or square base surface 13. Of course, other shapes are also conceivable. In particular, the base surface 13 can be configured to be elliptical or circular (see, in this regard, the outline in the top view of FIG. 4 shown with a broken line.) Specifically, the self-luminous body 104 can have a housing 2, 3 configured as a block or flat piece, which housing is formed by two essentially plate-shaped housing parts 2, 3 having a polygonal or elliptical or circular base surface 13, wherein the sum of the heights h of the two housing parts 2, 3 perpendicular to the base surface, is less than a short side length s or a minimal diameter d or radius of the same.

In FIG. 4, the fluorescent and/or phosphorescent layer 7 is disposed on the top side of the cavity 5, as an example, specifically directly on the housing part 3. No separate adhesive layer is provided, for example because a mixture of phosphoric acid ($H_3PO_4$) and zinc sulfide (ZnS) and/or zinc oxide (ZnO) was applied directly. Furthermore, the feeder opening 4 is not welded shut, but rather closed off with a plug 14.

Furthermore, supports 15 are provided in the cavity 5 in FIG. 4, so that the housing parts 2, 3 cannot bend excessively. For example, the supports 15 can be formed onto the housing part 2 or housing part 3 directly, and glued to the other housing part 2, 3, in each instance, for example. Of course, it is also conceivable that the supports 15 merely touch the other housing part 2, 3, in each instance, in other words are not permanently connected with it. As a further possibility, the supports 15 can also be present as separate components, which are connected with a housing part 2, 3 or with both housing parts 2, 3.

In FIGS. 1 to 4, a self-luminous body 101 . . . 104 having only one cavity 5 was always shown. Of course, such a body 101 . . . 104 can also comprise more than one cavity 5. These can be connected with connection lines, in chain-like manner, for example, and/or can be provided with feeder lines 4 that lead to the outside, in each instance.

Furthermore, it is possible that a cavity 5 has only one feeder opening 4 or also three and more feeder openings 4. In particular, if only one feeder opening 4 leads to a cavity 5, concentric lines can serve for inflow and outflow of the substance/medium to be conveyed into/out of the cavity 5, for example.

The variants of the self-luminous body 101 . . . 104 shown in the figures also show independent embodiments of the self-luminous body 101 . . . 104, in and of themselves, if applicable, whereby the same reference symbols or component designations are used for the same parts.

The special embodiment details shown for the different variants do not necessarily relate only to the figure in question, but rather can also be used in other embodiments, if applicable. For example, the feeder openings in FIG. 4 can be welded shut, instead of closing them off with a plug 14. Vice versa, the feeder openings 4 in FIG. 2 can also be closed off with a plug 14, instead of welding them shut.

Furthermore, it is pointed out that use of the self-luminous body 101 ... 104 is not restricted to watch construction. For example, use as an informational sign, emergency lighting, door sign, keyboard background lighting, for displays, aiming apparatuses and background lighting for displays and instruments and the like is also conceivable.

For the sake of good order, it is pointed out, in conclusion, that for a better understanding of the structure of the self-luminous body 101 ... 104, it and its components were shown not to scale and/or enlarged and/or reduced in size, in part.

The task on which the independent inventive solutions are based can be derived from the specification.

Above all, the individual embodiments shown in FIGS. 1 to 4 can form the object of the independent solutions according to the invention. The tasks and solutions according to the invention, in this regard, can be derived from the detailed description of these figures.

REFERENCE SYMBOL LIST

101 ... 104 self-luminous body
1 depression
2 first housing part (substrate)
3 second housing part (cover layer)
4 feeder opening
5 cavity
6 medium emitting decay radiation
7 fluorescent and/or phosphorescent layer/substance
8 adhesive
9 mask
10 weld seam
11 outer top surface of the self-luminous body
12 top surface of the cavity
13 base surface of the self-luminous body
14 plug
15 support element
d diameter
h height
s side length

The invention claimed is:

1. Method for the production of self-luminous bodies, comprising the steps:
   making at least one depression in at least one of a first housing part and a second housing part of a housing,
   producing a layer formed from a substance that can be excited to produce light, via decay radiation, on at least part of a delimitation wall of at least one cavity,
   producing the at least one cavity via joining the first and second housing parts together,
   connecting the first and second housing parts in gas-tight manner, wherein at least one feeder opening remains open into the at least one cavity from the outside, and
   introducing a medium that emits a decay radiation for a substance that can be excited to produce light, or the substance and the medium, into the at least one cavity, through the at least one feeder opening,
   wherein closing and welding of the at least one feeder opening takes place via laser radiation.

2. Method according to claim 1, wherein the layer is produced via coating at least one of the first housing part and the second housing part with an adhesive and subsequently applying the substance to the adhesive layer, the substance having at least one property selected from the group consisting of fluorescence and phosphorescence.

3. Method according to claim 2, wherein at least one of the adhesive, the substance, and the layer is applied to at least a part of at least one of the first and second housing parts before production of the at least one cavity.

4. Method according to claim 2, wherein at least one of the adhesive, the substance, and the layer is introduced into the at least one cavity through the at least one feeder opening.

5. Method according to claim 2, wherein the adhesive is applied to at least one of the first and second housing parts before production of the at least one cavity and the substance is introduced into the at least one cavity through the at least one feeder opening.

6. Method according to claim 2, wherein at least one of the adhesive and the substance is imprinted or stamped on.

7. Method according to claim 1, wherein the first and second housing parts are connected with one another via fusion bonding.

8. Method according to claim 1, wherein the first and second housing parts are connected with one another via anodic bonding.

9. Method according to claim 1, wherein the substance is introduced as a powder, as a gel, in the gas phase or as a solution.

10. Method according to claim 1, wherein an adhesion-mediating agent is applied between at least one of the first housing part and the second housing part and the substance.

11. Method according to claim 1, wherein
   phosphoric acid is applied as an adhesive and at least one of zinc sulfide and zinc oxide is introduced as the substance, or
   a mixture of phosphoric acid and at least one of zinc sulfide and zinc oxide is introduced as the layer.

12. Self-luminous body having a housing composed of at least first and second housing parts, and having a depression in at least one of the first and second housing parts, the first and second housing being connected with one another in gas-tight manner and enclosing a cavity,
   wherein two feeder openings to the cavity are provided, the at least one feeder opening extending from the outside into the cavity and closed and welded in gas-tight manner,
   wherein a layer of a substance that can be excited to produce light, via decay radiation, and a medium that emits decay radiation for a substance that can be excited to produce light are disposed in the cavity, and
   wherein the two feeder openings are closed off and welded shut via heat effect via laser radiation.

13. Self-luminous body according to claim 12, wherein at least one mask is disposed between the layer of the substance and at least one of the first and second housing parts.

14. Self-luminous body according to claim 12, wherein a mask that covers at least a part of the outer surface of the self-luminous body is disposed on the outside of the body facing away from the cavity.

15. Self-luminous body according to claim 12, wherein at least a part of a top surface of the first and second housing parts that delimits the cavity is coated with the substance, and wherein the substance has at least one property selected from the group consisting of fluorescence and phosphorescence.

16. Self-luminous body according to claim 12, wherein the layer or a ply of the substance is connected with the first and second housing parts by way of an adhesion-mediating agent.

17. Self-luminous body according to claim 12, wherein the material for the first housing part is glass, silicon or boron silicate.

18. Self-luminous body according to claim 12, wherein the substance is at least one substance selected from the group consisting of zinc sulfide, zinc oxide, zinc cadmium, magnesium sulfide, $Y_2O_2S$, and another radioluminescent substance.

19. Self-luminous body according to claim 12, wherein the substance is disposed in the cavity as a powder, as a gel, in the gas phase or as a solution.

20. Self-luminous body according to claim 12, wherein an adhesion-mediating agent is disposed between the first housing part and the substance.

21. Self-luminous body according to claim 12, wherein the first and second housing parts are distanced from one another using support elements distributed over the cavity, oriented perpendicular to the base surfaces of the cavity.

22. Self-luminous body according to claim 12, wherein a reflecting coating is disposed on the side of the body facing away from an observer side.

23. Self-luminous body according to claim 12, comprising a coating reflecting on the back side, so that the produced light can be approximately doubled toward the observer.

24. A display instrument comprising a self-luminous body according to claim 12, the display instrument being selected from the group consisting of a watch, a screen, and a compass.

25. The display instrument according to claim 24, wherein the self-luminous body is a watch crystal or a face of the display instrument.

* * * * *

UNITED STATES PATENT AND TRADEMARK OFFICE
CERTIFICATE OF CORRECTION

| | | |
|---|---|---|
| PATENT NO. | : 9,488,318 B2 | Page 1 of 1 |
| APPLICATION NO. | : 14/424773 | |
| DATED | : November 8, 2016 | |
| INVENTOR(S) | : Kind et al. | |

It is certified that error appears in the above-identified patent and that said Letters Patent is hereby corrected as shown below:

In the Claims

In Column 10, Line 40 (Line 8 of Claim 12) before the word "closed" please insert the word: --being--.

Signed and Sealed this
Tenth Day of January, 2017

Michelle K. Lee
*Director of the United States Patent and Trademark Office*